United States Patent [19]
Robertson et al.

[11] Patent Number: 5,811,004
[45] Date of Patent: Sep. 22, 1998

[54] WATER FILTRATION CARTRIDGE

[75] Inventors: Edward J. Robertson, Reading; Mark Florence, Jamaica Plain, both of Mass.

[73] Assignee: Syratech Corporation, East Boston, Mass.

[21] Appl. No.: 709,504

[22] Filed: Sep. 6, 1996

Related U.S. Application Data

[63] Continuation of Ser. No. 53,793, Apr. 30, 1996, and Ser. No. 53,908, May 1, 1996.

[51] Int. Cl.⁶ ..................................................... B01D 24/14
[52] U.S. Cl. .......................... 210/482; 210/473; 210/266
[58] Field of Search .................................... 210/264, 265, 210/206, 282, 472, 473, 482

[56] References Cited

U.S. PATENT DOCUMENTS

| | | | |
|---|---|---|---|
| 103,592 | 5/1870 | Farson . | |
| D. 163,117 | 5/1951 | Hobbs | D7/318 |
| D. 173,455 | 11/1954 | Reinecke et al. | D7/317 |
| D. 213,796 | 4/1969 | Marue | D7/317 |
| D. 227,535 | 7/1973 | Grimis | D7/318 |
| D. 312,863 | 12/1990 | Hankammer | D23/209 |
| D. 318,095 | 7/1991 | Hankammer | D23/212 |
| D. 319,186 | 8/1991 | Nylander | D7/317 |
| D. 320,935 | 10/1991 | Nylander | D7/317 |
| D. 322,401 | 12/1991 | Nylander | D7/317 |
| D. 325,768 | 4/1992 | Hankammer | D23/212 |
| D. 331,446 | 12/1992 | Gidman | D7/317 |
| D. 335,608 | 5/1993 | Arnold | D7/317 |
| D. 336,760 | 6/1993 | Raunkjaer | D7/317 |
| D. 337,691 | 7/1993 | Raunkjaer | D7/317 |
| D. 337,760 | 7/1993 | Schneider | D14/109 |

(List continued on next page.)

OTHER PUBLICATIONS

Brita Ultra II Water Filtering Pitcher, The Washington Post, Dec. 7, 1994.
Brita, Packaging Materials for Brita Water Filtration Pitcher, Ultra II Model, c. 1994.
Brita, Packaging Materials for Brita Water Filtration Pitcher, Standard Model, c. 1994.
Brita, Packaging Materials for Brita Water Filtration Pitcher, Contour Model, c. 1996.
Brita, "Support The Leader. And Watch Profits Pour In." (Undated).
Brita, "How to Acquire Good Taste." c. 1995.
Brita, "We Can't Take You There. But We Can Give You A Taste." c. 1996.
Brita, "Drop For Drop Brita Makes It Better."(Undated).
Brita, "The Brita Replacement Filter A Built–In Porfit Opportunity" (Undated).
Cook, J., "Give Ordinary Tap Water A Clean, Mountain Spring Taste." p. 25, Summer 1996.

(List continued on next page.)

*Primary Examiner*—David A. Reifsnyder
*Attorney, Agent, or Firm*—Fish & Richardson P.C.

[57] ABSTRACT

A reservoir of a water filtration system carries a projection such as a fin on its outer surface. The reservoir is removably received in a housing, such as a pitcher, such that the projection engages a shelf in the housing. A passage in the reservoir can have a nonuniform taper that corresponds to the outer surface of a water filtration cartridge. A grippable member such as an indicator dial can be movably attached to the outer surface of the housing. For each orientation, use indicia on the grippable member align with use indicia on the outer surface of the housing in a unique visual configuration. A water filter cartridge for the filtration system can have an inner surface that extends between a water inlet and a water outlet. One portion of the inner surface starts at the water inlet and joins at its other end to a second portion of the inner surface. The second portion of the inner surface is about as long as the first portion, and is tapered. The small-diameter end of the tapered portion extends to the water outlet of the filter cartridge. The cartridge can also have two ridges on the inner surface of the housing between the water inlet and outlet, both projecting inward towards the center axis of the housing. The innermost end of the ridge closest to the water inlet is farther from the center axis than the innermost end of the other ridge.

18 Claims, 14 Drawing Sheets

U.S. PATENT DOCUMENTS

| | | | |
|---|---|---|---|
| D. 370,711 | 6/1996 | Serenko et al. | D23/209 |
| D. 374,911 | 10/1996 | Kahana | D23/209 |
| 795,408 | 7/1905 | Nebinger | D7/317 |
| 2,805,561 | 9/1957 | Emmert et al. | D7/317 |
| 3,374,897 | 3/1968 | Martin | 210/455 |
| 3,554,377 | 1/1971 | Miller | 210/275 |
| 3,747,767 | 7/1973 | Hankammer | 210/282 |
| 3,861,565 | 1/1975 | Rickmeier, Jr. | D7/317 |
| 4,196,081 | 4/1980 | Pavia | 210/94 |
| 4,199,449 | 4/1980 | Slejko . | |
| 4,306,971 | 12/1981 | Hankammer | 210/282 |
| 4,430,226 | 2/1984 | Hegde et al. | 210/638 |
| 4,556,484 | 12/1985 | Hunter et al. | 210/416.3 |
| 4,606,823 | 8/1986 | Lucas, III | 210/282 |
| 4,623,457 | 11/1986 | Hankammer | 210/237 |
| 4,653,671 | 3/1987 | Duffy et al. | D7/317 |
| 4,666,600 | 5/1987 | Hankammer | 210/266 |
| 4,693,823 | 9/1987 | Matchett | 210/266 |
| 4,749,484 | 6/1988 | Greenhut | 210/266 |
| 4,759,844 | 7/1988 | Lipschultz et al. | 210/257.2 |
| 4,826,594 | 5/1989 | Sedman | 210/266 |
| 4,885,089 | 12/1989 | Hankammer | 210/420 |
| 4,894,154 | 1/1990 | Roz et al. | 210/266 |
| 4,895,648 | 1/1990 | Hankammer | 210/188 |
| 4,913,808 | 4/1990 | Haque | 210/93 |
| 4,969,996 | 11/1990 | Hankammer | 210/282 |
| 4,978,449 | 12/1990 | Devine et al. | 210/264 |
| 4,986,901 | 1/1991 | Nohren, Jr. et al. | 210/85 |
| 5,009,364 | 4/1991 | Bolte | D7/316 |
| 5,049,272 | 9/1991 | Nieweg | 210/266 |
| 5,076,912 | 12/1991 | Belz et al. | 210/94 |
| 5,076,922 | 12/1991 | DeAre | 210/282 |
| 5,106,501 | 4/1992 | Yang et al. | 210/266 |
| 5,110,479 | 5/1992 | Frommer et al. | 210/662 |
| 5,114,570 | 5/1992 | Nelson et al. | 210/94 |
| 5,149,437 | 9/1992 | Wilkinson et al. | 210/665 |
| 5,190,643 | 3/1993 | Duncan et al. | 210/85 |
| 5,225,078 | 7/1993 | Polasky et al. | 210/264 |
| 5,238,559 | 8/1993 | Nieweg | 210/264 |
| 5,271,837 | 12/1993 | Discepolo et al. | 210/282 |
| 5,486,285 | 1/1996 | Feeney | 210/85 |
| 5,536,396 | 7/1996 | Mudra et al. | 210/282 |

OTHER PUBLICATIONS

Culligan, Packaging Materials for Healthometer Oval Water Filtration Pitcher, c. 1996.

Culligan, "The Drink Your Body Deserves." c. 1996.

Glacier Pure, Packaging Materials for Glacier Pure Premier Tap Water Filtering System Premiere Carafe Model 63000 (Undated).

Glacier Pure, Packaging Materials for Glacier Pure Two Gallon Processor Product No. 62246 (Undated).

Glacier Pure, Packaging Materials for Glacier Pure One Gallon Pitcher Model G9962290 (Undated).

Glacier Pure, Packaging Materials for Glacier Pure 3 Replacement Filters Product No. 62248 (Undated).

Glacier Pure, Packaging Materials for Glacier Pure Replacement Filter Model G9962245 (Undated).

HFN Buyer's Guide, "Water Filter Systems How to Choose, Merchandise And Understand The Category," pp. 1–18, Jul. 29, 1996.

HFN Buyer's Guide, "Pollution Concerns Push Water Purifiers," p. 150, Jan. 15, 1996.

HFN Buyer's Guide, "Water Filters Everywhere," pp. 40–41, May 29, 1995.

PUR, Packaging Materials for PUR Water Filtration Pitcher, Model CR–500, c. 1996.

Solis, "Solis Aqua Select The Water–Purifying System" (Undated).

Solutions, "Remove 98% Of Lead And 95% Of Chlorine From Your Drinking Water When You Pour It Into This Pitcher" (Undated).

Teledyne Water Pik, Packaging Materials for Teledyne Water Pik Pour–Thru Water Filtration Pitcher System Model WP–1, c. 1996.

Teledyne Water Pik, "Pour–Thru Water Filter System Teledyne Water Pik Puts You In Control of Great Tasting Water!" c. 1996.

Teledyne Water Pik, "99% Of The Water On Earth Is Undrinkable" (Undated).

Time, Health, "Do Water Filters Work?", Jun. 10, 1996.

WTC Ecomaster, "PureIt InLine 1000" c. 1996.

WTC Ecomaster, "PureIt Water Filtration Systems The Inexpensive Alternative to Bottled Water" c. 1995.

WTC Ecomaster, PentaPure, Oasis, PureIt, The Spring, Water Filtration Systems, c. 1995 and Apr. 1, 1996.

PCT Search Report, PCT/US96/17426, Feb. 3, 1997.

Appln. 7120111 Mar. 16, 1992 Tawain (Publication No. 42506).

Appln. 74205335 Oct. 16, 1985 Taiwan (Publication No. 71387).

WATER FILTRATION CARTRIDGE

CROSS REFERENCE TO RELATED APPLICATIONS

This is a continuing application of U.S. application Ser. No. 29/053,908, filed May 1, 1996, and entitled "Water Pitcher," and of U.S. application Ser. No. 29/053,793, filed Apr. 30, 1996, and entitled "Filter Cartridge."

BACKGROUND OF THE INVENTION

This invention relates to water filtration systems, and in particular to systems for filtering water for personal consumption.

Typical personal-use water filtration systems are either gravity-fed or pressure-fed. Gravity-fed systems are often divided into two chambers. An upper chamber, or "reservoir," receives a charge of water to be filtered, and a lower chamber stores filtered water. A filter connects the upper and lower chambers, providing a fluid flow path through one or more filtering media from the upper chamber to the lower chamber.

In use, the user fills the upper chamber with water, typically common tap water. As water flows from the upper chamber into the lower, it is filtered by the media to remove, e.g., unpleasant odors, metals, and other impurities. The water usually flows from the upper to the lower chamber under the force of gravity alone, and so the filtration process can take several minutes or longer, depending on the design of the filter, the chambers, etc. As a result, gravity-fed water filtration systems are often "batch" processors, in that the upper and lower chambers are sized to receive more than a single serving of water. The user might fill the upper chamber and set the unit aside in a refrigerator or other cool place. Filtered water can then later be removed as needed from the lower chamber, with only periodic replenishing of the upper chamber.

With increased usage, the filtering media loses its effectiveness, often as a result of clogging or contamination by impurities removed from the incoming water. To maintain a desired quality of filtered water, it is usually recommended that the filter be discarded after a specified volume of water has been filtered. The spent filter is then replaced with a fresh one.

Pressure-fed water filtration systems are typically connected directly to the plumbing. The water pressure force is usually greater than the gravity force, allowing higher flow rates to be maintained through the filtering media. As a result, pressure-fed systems often operate "on demand," filtering water as needed for immediate consumption.

SUMMARY OF THE INVENTION

One aspect of the invention relates to a water filtration system in which a projection is carried on the outer surface of a reservoir. The reservoir is removably received in a housing, such that the projection engages a shelf in the housing.

Among other advantages, the projection aids in positioning the reservoir within the housing, while at the same time allowing the reservoir to be readily removed. The projection also serves as a spacer to provide an air gap between the outer surface of the reservoir and the inner surface of the housing. The air gap facilitates air circulation and water flow between the reservoir and the housing, and also reduces water trapping (e.g., from capillary action and/or pooling), resulting in an environment less hospitable to bacteria, mold, and/or other microorganisms.

Preferred embodiments of this aspect of the invention include the following features. The projection is a tapered fin, with the upper end of the fin being smaller than the lower end. The reservoir, which is generally square in cross-section, carries one such fin at each of its edges, with the lower end of each fin lying flush with the bottom of the reservoir. When the reservoir is received in the housing (e.g., a pitcher with a spout and a handle), three of the four fins engage the shelf. To avoid water collecting on the shelf, it is radiused and slopes down toward the bottom of the housing. To further promote the positive interconnection of the reservoir and the pitcher, the top edge of the reservoir engages the inner surface of the housing. With the reservoir received in the pitcher, there is an air gap extending substantially all the way around the reservoir between the outer surface of the reservoir and the inner surface of the pitcher.

Another aspect of the invention relates to a water filtration system in which a grippable member is movably attached to an outer surface of a housing, such that the grippable member can be moved to several orientations. For each orientation, use indicia on the grippable member align with use indicia on the outer surface of the housing in a unique visual configuration.

Among other advantages, the grippable member (e.g., a rotary indicator dial) facilitates tracking of the amount of water processed by a filter cartridge in the system. At periodic intervals, e.g., at each refilling of the upper chamber of the system, a user can move the grippable member to a new orientation. Without having to disassemble the water filtration system, the user can later inspect the use indicia on the grippable member and the use indicia on the housing. From the unique visual configuration of the use indicia, the user can readily determine, e.g., the remaining usable life of the filter.

In preferred embodiments of this aspect of the invention, the use indicia on the housing includes a pointer adjacent to the indicator dial. The use indicia on the grippable member (e.g., a dial) can be a sequence of numerals or letters. However, the dial is often small and there are typically on the order of thirty to fifty rotational steps per revolution of the dial, and so alphanumeric use indicia may be difficult to see. To facilitate readability, color indicia can be used in addition to or instead of alphanumeric indicia. For instance, the color use indicia can be one or more color bands. Where there are plural color bands, each band can be tapered and provided with a different uniform color. The bands encircle the dial, such that the narrow end of one of the color bands (e.g., a green band) aligns with the wide end of another one of the color bands (e.g., a red band). Where there is a single color band, the color of color bands can vary along the length of the band, or the color can vary along a first portion of the band (e.g., aqua to black), and be uniform along a second portion of the band (e.g., aqua).

Another aspect of the invention relates to a water filter cartridge. The cartridge has an inner surface that extends between a water inlet and a water outlet. One portion of the inner surface (e.g., a cylindrical surface) starts at the water inlet and joins at its other end to a second portion of the inner surface. The second portion of the inner surface is about as long as the first portion, and is tapered (e.g., it is a frusto-conical surface). The small-diameter end of the tapered portion extends to the water outlet of the filter cartridge.

The inner surface of the cartridge has a nonuniform taper, in that its taper changes between the water inlet and the water outlet. Specifically, the taper of the surface near the water outlet is greater than the taper of the surface near the water inlet.

The surface near the water outlet serves to smooth the transition between the less-tapered surface near the water inlet and the water outlet, promoting uniform flow through the filter. Increasing the cross-sectional area of the surface near the water inlet (e.g., increasing the diameter, if this region is cylindrical) increases the volume available to hold filtering media. The water outlet, on the other hand, is often smaller in order to provide a desired flow rate and uniformity. For a given overall filter diameter, making the surface near the water outlet substantially equal in length to the surface near the water inlet balances the desire for a relatively large-volume region to hold filtering media with the desire for a smooth transition to the typically smaller water outlet.

In another aspect of the invention, an extension attached, e.g., to the bottom of a reservoir, has a passage configured to removably receive a water filtration cartridge. The passage has a nonuniform taper that corresponds to the outer surface of the body of the water filtration cartridge.

The passage is thus configured to receive a water filtration cartridge in which the outer surface of the body has a nonuniform taper. (Such a cartridge might have, e.g., an inner surface with a nonuniform taper and walls of relatively constant thickness.) Because the nonuniform taper of the passage corresponds to the contour of the outer surface of the body of the cartridge, the cartridge can be quickly and positively installed into the passage. In addition, the close fit results in a relatively water impervious seal between the passage and the cartridge.

In preferred embodiments of this aspect of the invention, the passage also has a recess at the upper end of the extension for receiving the cap of the water filtration cartridge.

In another aspect of the invention, a water filtration cartridge has a water inlet and a water outlet. There are two ridges on the inner surface of the cartridge between the water inlet and outlet, both projecting inward towards the center axis of the cartridge. The innermost end of the ridge closest to the water inlet is farther than the innermost end of the other ridge from the center axis.

The ridges, stepped in this manner, cause at least a portion of the water flowing down the inner surface of the cartridge (where it has only limited contact with filtering media in the interior of the cartridge) to separate from the surface and reenter the main body of the media for increased filtering interaction. The first ridge deflects some of the water flowing along the inner surface back into the media. Water not so deflected passes next to the second ridge. Because the second ridge projects farther inward than the first ridge, it is able to catch and deflect water cascading off the first ridge.

Preferred embodiments of this aspect of the invention include a third ridge between the second ridge and the water outlet, where the innermost end of the third ridge is closer than the innermost end of the second ridge to the central axis of the cartridge. The ridges are parallel to and immediately adjacent to one another on a frustoconical inner surface of the cartridge.

Other features and advantages of the invention will become apparent from the following detailed description, and from the claims.

DESCRIPTION OF THE PREFERRED EMBODIMENTS

Figure 1:
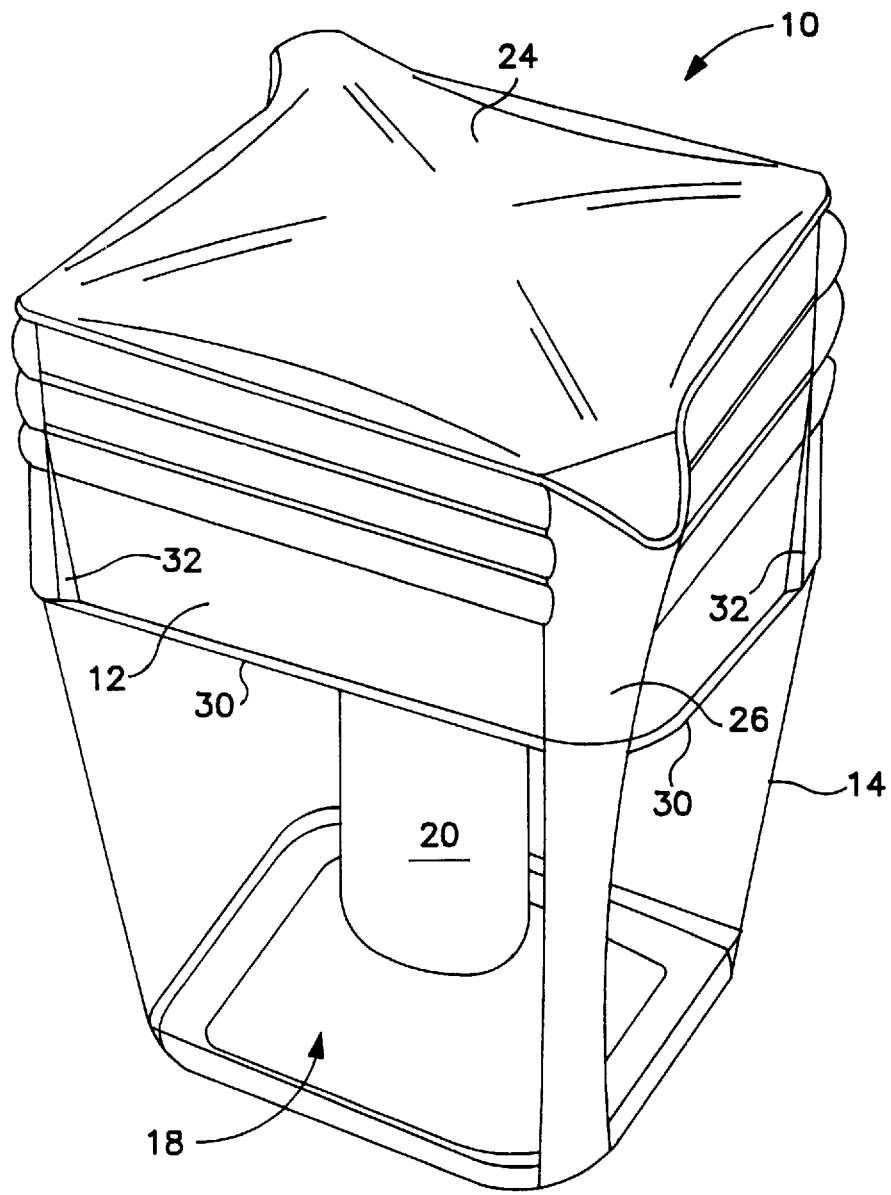
FIG. 1 is a perspective view of a water filtration system.
Figure 2:
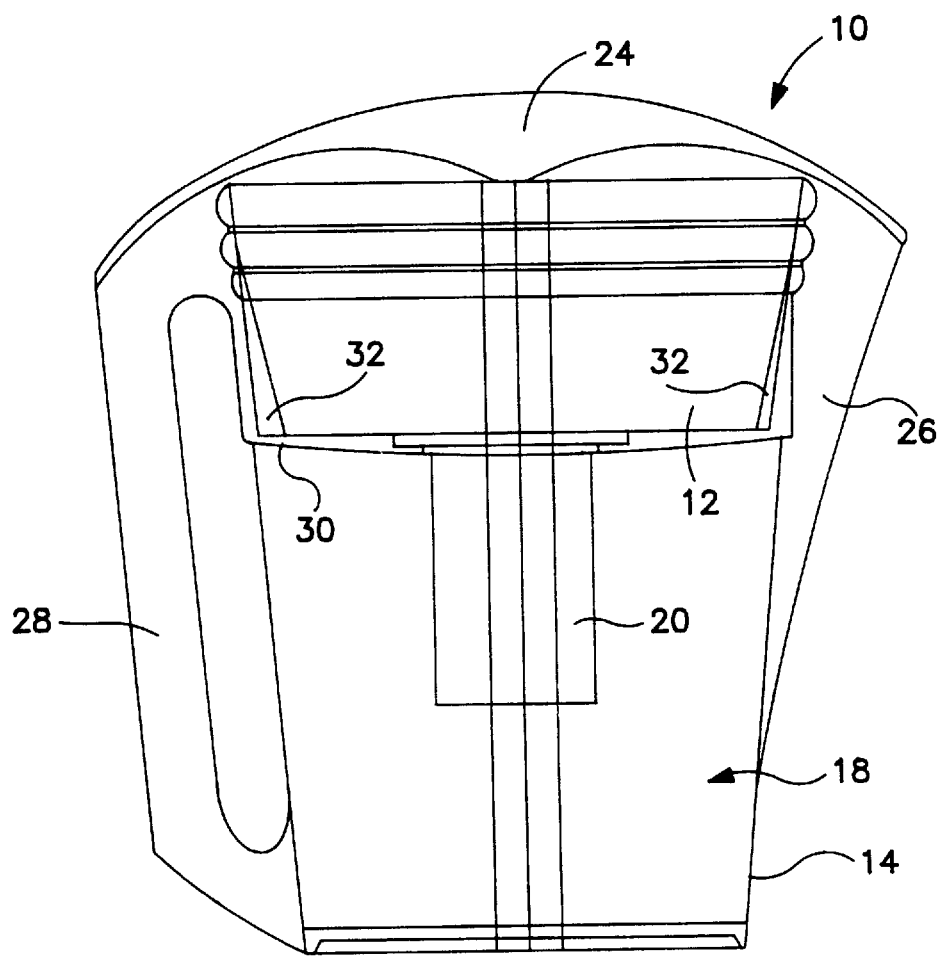
FIG. 2 is a side view of the water filtration system of FIG. 1.
Figure 3:
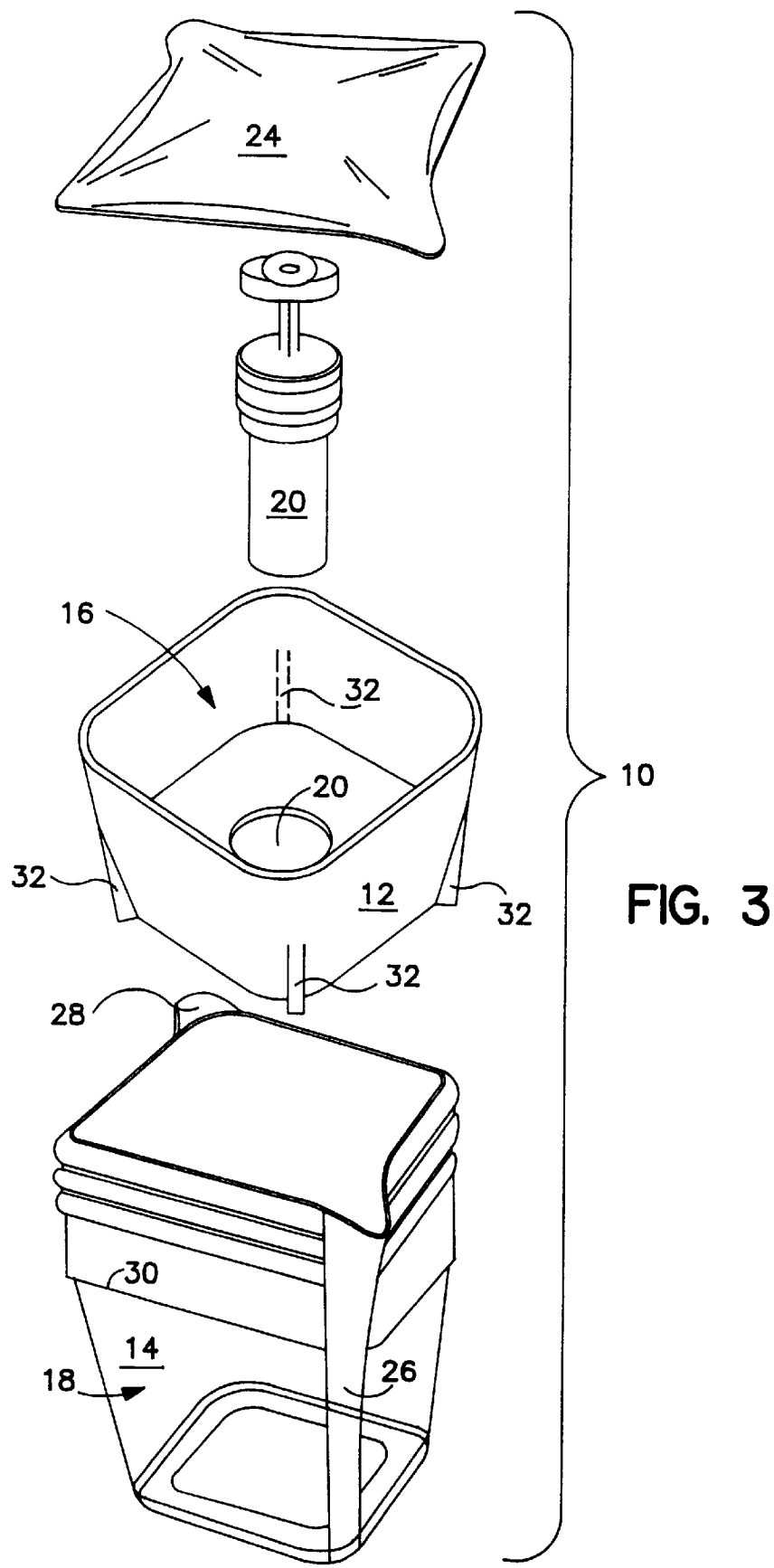
FIG. 3 is an exploded view of the water filtration system of FIG. 1.

As shown in FIGS. 1–3, a water filtration system 10 includes a reservoir 12 removably received in the upper end of a pitcher 14. Reservoir 12 defines an upper water-receiving chamber 16, and pitcher 14 defines a lower water-receiving chamber 18. A filter cartridge 20 (e.g., product nos. GPF1 or GPF3, available from Glacier Pure by Farberware, Boston, Mass.) removably installed in an opening 22 in the bottom of reservoir 12 provides a fluid flow path from upper chamber 16 to lower chamber 18. A removable lid 24 covers the open upper ends of the reservoir and the pitcher.

Pitcher 14 is comprised of a translucent material that is relatively nonreactive with water, such as acrylic. A spout 26 extends along one edge of the pitcher and into lower chamber 18, and a handle 28 attached to the opposite edge of the pitcher facilitates pouring from and transport of the pitcher.

The upper region of pitcher 14 is sized and configured to receive reservoir 12. As shown in detail in FIG. 4, reservoir 12 is prevented from dropping down into lower chamber 18 by a shelf 30 on the inner surface of the pitcher. Shelf 30 is radiused such that it slopes downward toward lower chamber 18 to guard against water collecting on the shelf. As shown in FIGS. 1 and 3, shelf 30 extends almost completely around the inside wall of pitcher 14, except in the region of spout 26.

Reservoir 12 is comprised of an opaque material that is relatively nonreactive with water, such as polypropylene. Between its upper and lower ends, reservoir 12 is generally square in cross-section, although the edges of the reservoir are gently radiused. (The reservoir can be of any shape, including round, oval, or polygonal.) Each edge of the reservoir carries a fin 32 that projects outward from the outer surface of the reservoir. The lower ends of the fins define a plane, and lie flush with the bottom surface of the reservoir.

Figure 4:
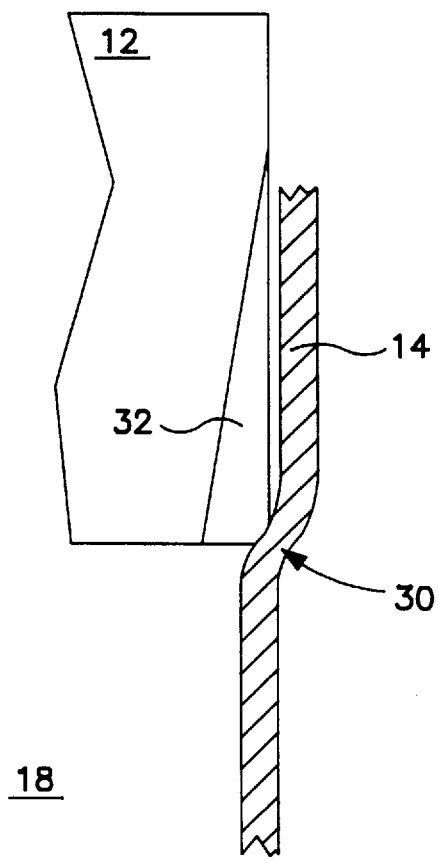
FIG. 4 is a partially cross-sectional side view of detail of FIG. 1.
Figure 5:
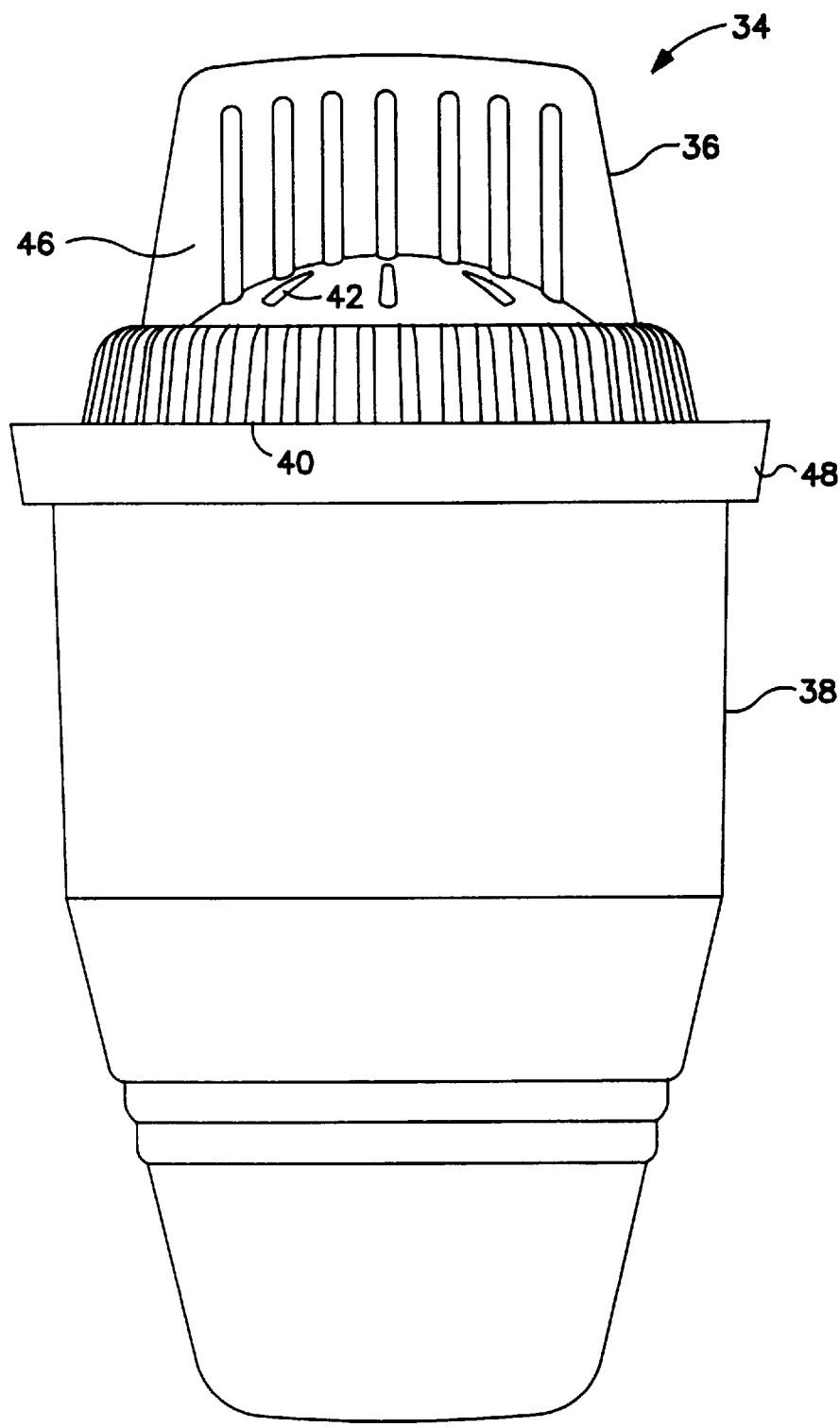
FIG. 5 is a side view of a water filtration cartridge.

When reservoir 12 is installed into pitcher 14, the lower ends of three of the four fins engage shelf 30, as shown in detail in FIG. 4. The fourth fin aligns with spout 26, and is unsupported by shelf 30. The outer edges of all four fins engage the inside edges of the pitcher. As can be seen in FIG. 2, near the top of the reservoir, a narrow band-like region of the outer surface of the reservoir contacts the inner surface of the pitcher. The rest of the outer wall of the reservoir is spaced-apart from the inner wall of the pitcher.

The fins 32 and the narrow band-like region near the top of the reservoir, while allowing the reservoir to be readily removed, solidly position the reservoir within the pitcher with only limited contact with the inside surface of the pitcher. This structure provides an air gap between the outer surface of the reservoir and the inner surface of the housing, which extends substantially entirely around the reservoir, except in the regions of fins 32. The air gap facilitates air circulation and water flow between the reservoir and the housing, and also reduces water trapping (e.g., from capillary action and/or pooling), resulting in an environment less hospitable to bacteria, mold, and/or other microorganisms.

Other embodiments are within the scope of the following claims.

For instance, many types of water filtration cartridges can be used in system 10 instead of filter 20. An alternative filter cartridge 34 is shown in FIGS. 5–10. Filter cartridge 34 includes a cap 36, shown in detail in FIG. 8, and a body 38, shown in detail in FIGS. 9 and 10.

Cap 36 defines a series of water inlet holes 40 spaced circumferentially near the periphery of the cap. Cap 36 also defines two sets of air vent holes 42, 44. Air vent holes 42 are located just above water inlet holes 40, and air vent holes 44 are located in the top of a hollow handle 46 at the upper end of the cap.

Figure 9:
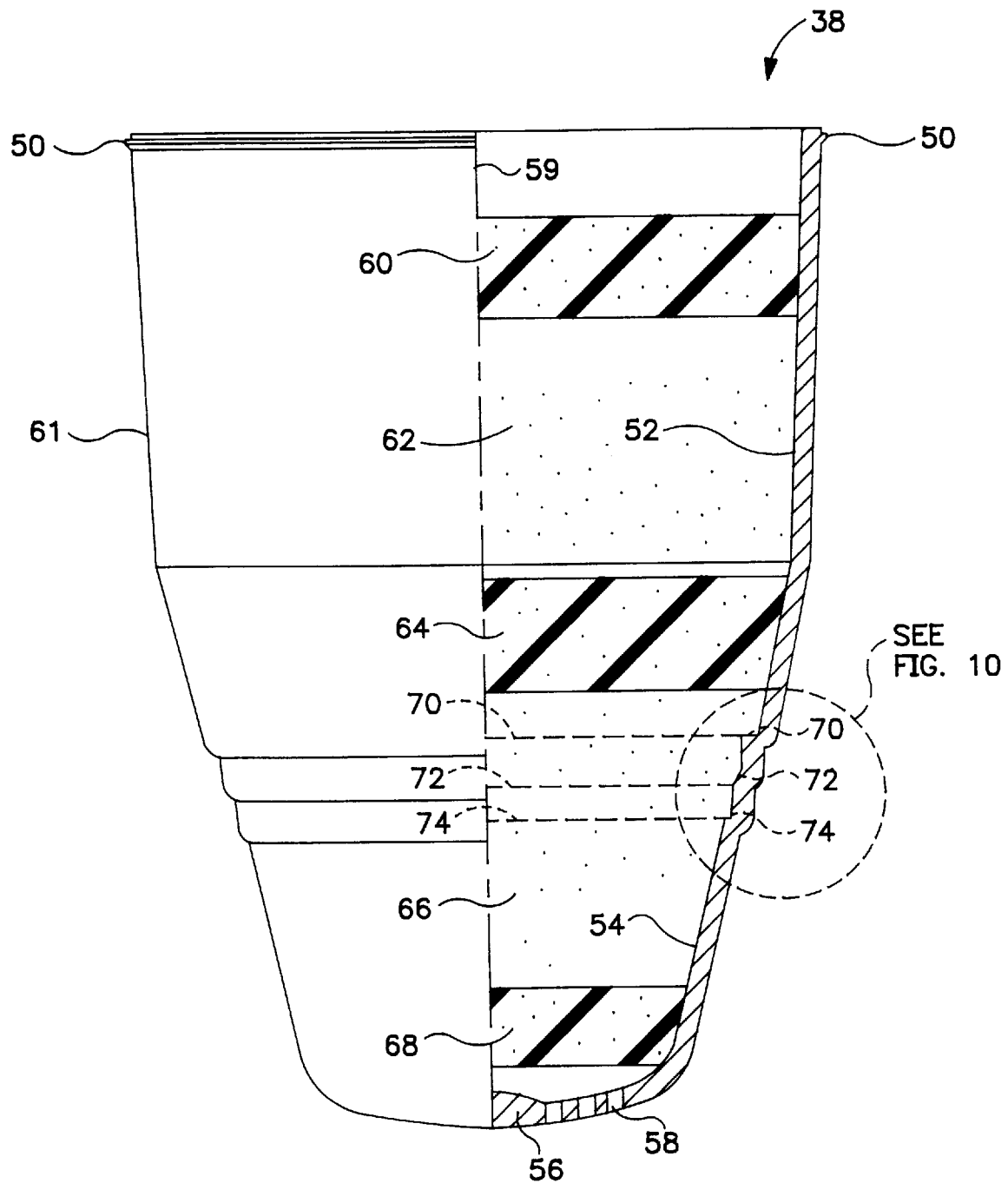
FIG. 9 is a partially cross-sectional side view of a body for the water filtration cartridge of FIG. 5.

A circumferential latch 48 at the lower end of cap 36 engages a mating ridge 50 at the upper end of body 38 (FIG. 9). With latch 48 and ridge 50 mated together, there is a substantially water-tight seal between cap 36 and body 38.

Figure 7:
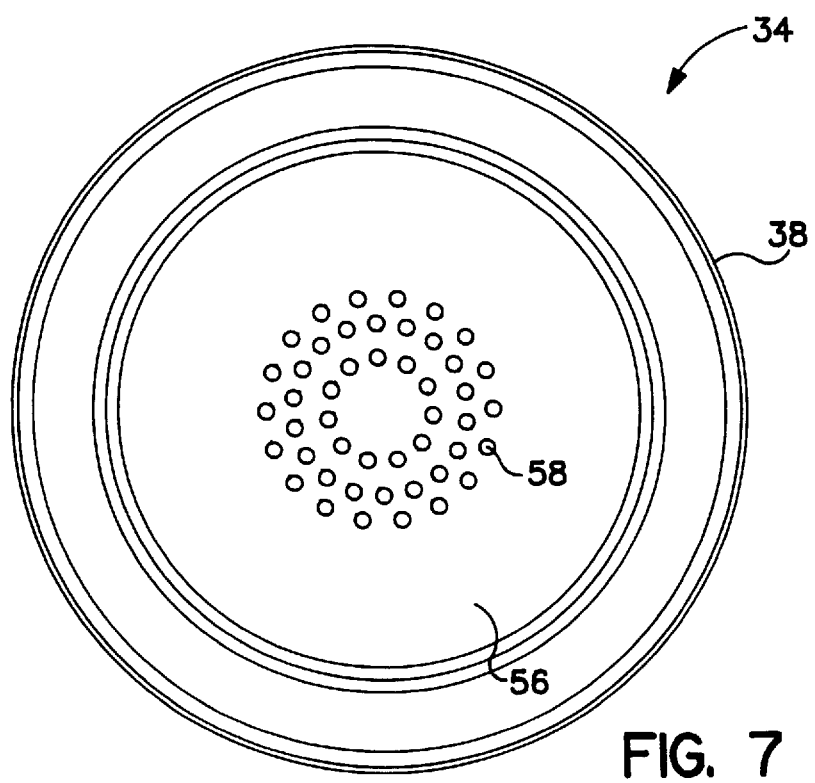
FIG. 7 is a bottom view of the water filtration cartridge of FIG. 5.

As shown in FIG. 9, the inner surface of body 38 has a cylindrical surface 52 (e.g., 1.9 in., or 4.8 cm., in diameter) joined at its lower end to the large-diameter end of a frustoconical surface 54. A wall 56 encloses the small-diameter end (which is, e.g., 1.0 in., or 2.5 cm., in diameter) of the frustoconical surface, and an array of water outlet holes 58 are defined in wall 56 (FIGS. 7 and 9). Body 38 can be molded (e.g., injection-molded) as a single piece, or it can be assembled by, e.g., bonding two or more component pieces together. Filter cartridge 34 need not be round in cross-section, but could be, e.g., oval or polygonal instead.

A central axis 59 extends between the upper and lower ends of the cartridge. The length of cylindrical surface 52 along this central axis is approximately equal to the length of frustoconical surface 54. For instance, cylindrical surface 52 can be 1.3 in. (3.3 cm.) long, and frustoconical surface 54 1.5 in. (3.8 cm.) long.

The outer surface 61 of body 38 corresponds to the inner contour defined by surfaces 52, 54, in that it too is cylindrical at the top, and frustoconical at the bottom. The taper along the length of the body is "nonuniform," in that the taper changes over a region of the body. (Taper can be defined as the variation in cross-sectional area per unit length along central axis 59.) The taper of the cylindrical section is substantially constant at zero, and the taper of the frustoconical section is substantially constant at a finite value. At the interface region between the two sections, the taper of the body changes, from one value (the zero taper of the cylinder), to another (the finite taper of the frustocone).

Figure 6:
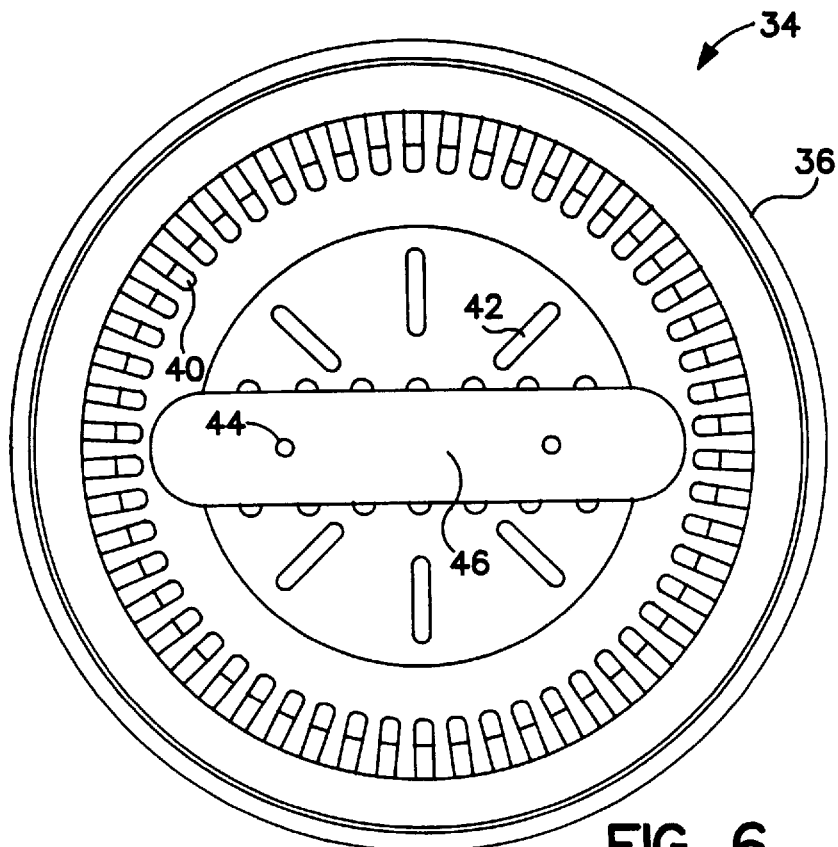
FIG. 6 is a top view of the water filtration cartridge of FIG. 5.
Figure 8:
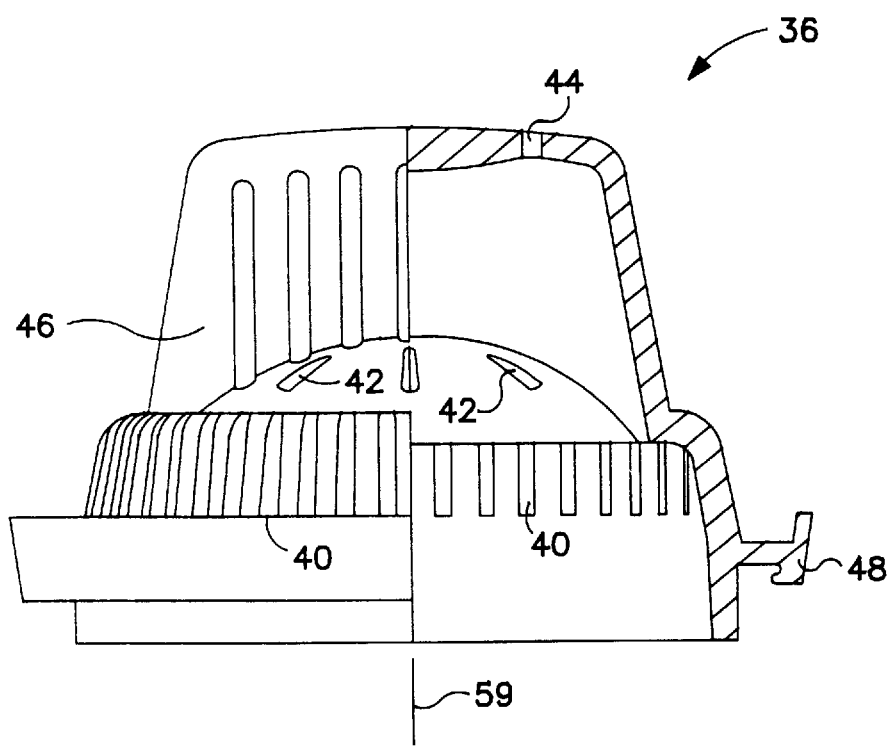
FIG. 8 is a partially cross-sectional side view of a cap for the water filtration cartridge of FIG. 5.

Enclosed within body 38 are five filtering layers. Water entering body 38 through water inlet holes 40 (FIGS. 5, 6, and 8) passes first through an open-cell upper foam layer 60, e.g., of polystyrene. Upper foam layer 60 serves several purposes, including filtering out larger debris from the incoming water stream and preventing the filtering media 62 (e.g., a layer of cationic exchange resin) disposed directly below it from escaping out water inlet holes 40 or air vent holes 42, 44 (FIGS. 6 and 8). An intermediate foam layer 64 directly below filtering media 62 prevents media 62 from intermixing with filtering media 66 (e.g., a layer of silver-containing activated charcoal). A lower foam layer 68 prevents filtering media 66 from escaping out water outlet holes 58.

As it passes through the filtering bed comprising layers 60, 62, 64, 66, 68, the water is funneled down to the array of outlet holes 58 by frustoconical surface 54. The size and number of the outlet holes are chosen to restrict flow such that the water interacts with filtering media 62, 66 for a desired length of time, e.g., to remove impurities. By funneling water from the cylindrical region defined by surface 52 to the smaller array of outlet holes 58, frustoconical surface 54 facilitates substantially uniform water flow through the filtering bed. Uniform water flow reduces the likelihood of "channelling," where a disproportionate amount of water flows through a small pathway in the media, often exhausting the media along the pathway prematurely and/or sweeping away media to form a relatively unimpeded flow channel.

In short, frustoconical surface 54 serves as a smooth transition between cylindrical surface 52 and the array of outlet holes 58, promoting uniform flow between the two. Cylindrical surface 52 can be chosen to have a relatively large diameter so that surfaces 52, 54 enclose a relatively large volume in order to hold a relatively large amount of filtering media. The array of holes 58, on the other hand, often spans an area smaller than the diameter of cylindrical surface 52, such that the total flow area of holes 58 provides a desired flow rate, and the distribution of holes 58 provides a desired flow uniformity. For a given overall filter diameter, making frustoconical surface 54 substantially equal in length to cylindrical surface 52 balances the desire for a large-volume region to hold filtering media with the desire for a smooth transition to the typically smaller array of outlet holes 58.

Figure 10:
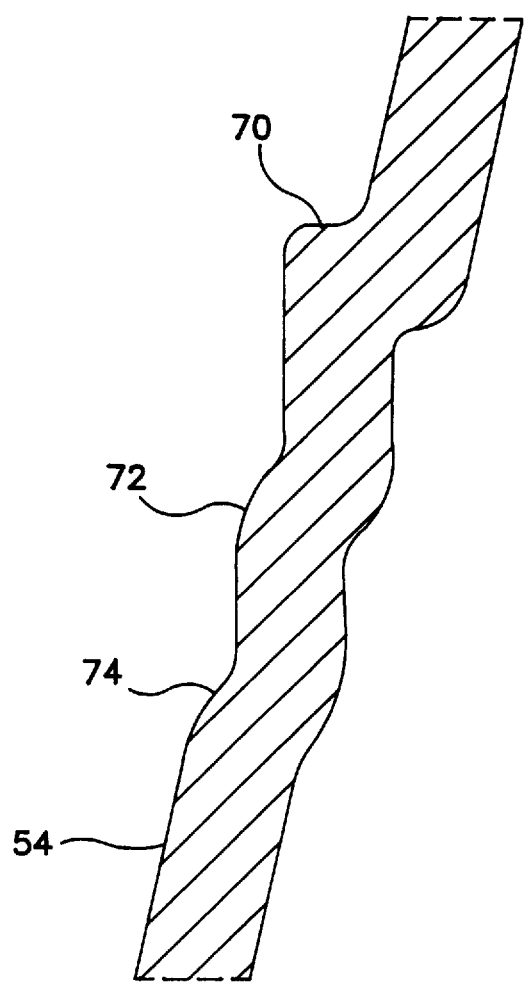
FIG. 10 is a cross-sectional side view of a detail region of FIG. 9.

As shown in detail in FIG. 10, filter body 38 further includes three ridges 70, 72, 74, disposed immediately adjacent to one another in frustoconical surface 54. The ridges project towards and are coaxial with the central axis 59 of the cartridge. The ridges are "stepped," such that the innermost point of the uppermost ridge 70 is farther from the central axis than the innermost point of the intermediate ridge 72, which in turn is farther from the central axis than the innermost point of the lowermost ridge 74. Water flowing down the inner wall of the filter body (where it has only limited contact with the filtering media) contacts the uppermost ridge 70 first. The ridge can cause some of the water to separate from the surface and reenter the main body of the filtering media for increased filtering interaction. Water that continues to flow along the surface then contacts intermediate ridge 72, where the process is repeated. Because the intermediate ridge projects farther inward than the upper ridge, even water that cascades directly downward off the uppermost ridge 70 is disrupted by intermediate ridge 72. The process is then repeated with lowermost ridge 74.

Figure 11:
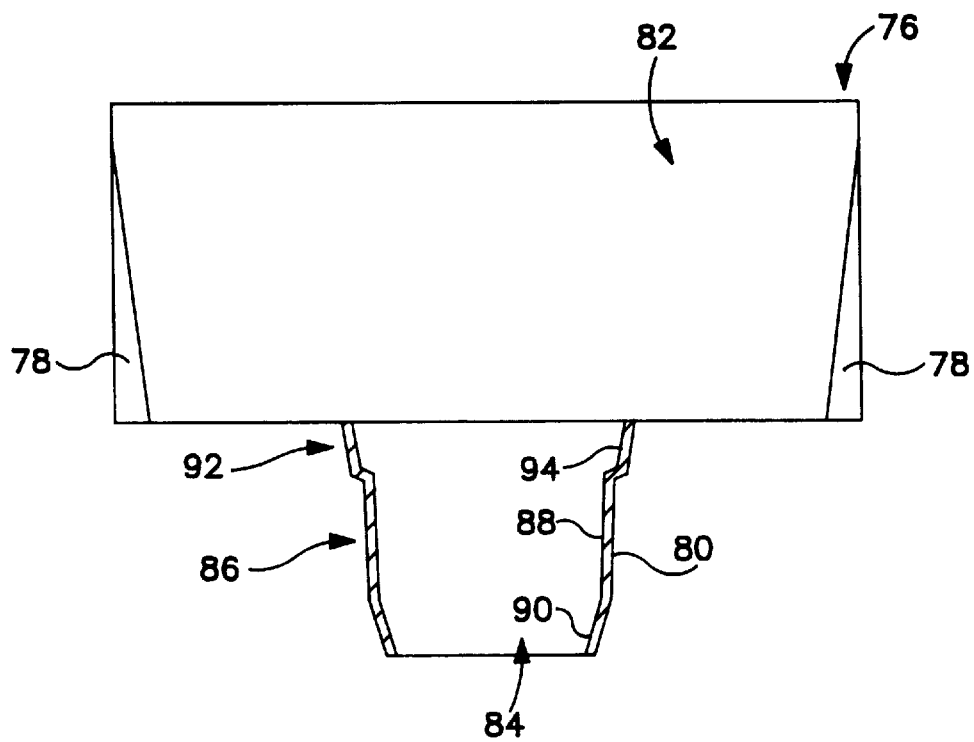
FIG. 11 is a partially cross-sectional side view of a reservoir for receiving the water filtration cartridge of FIG. 5.
Figure 12:
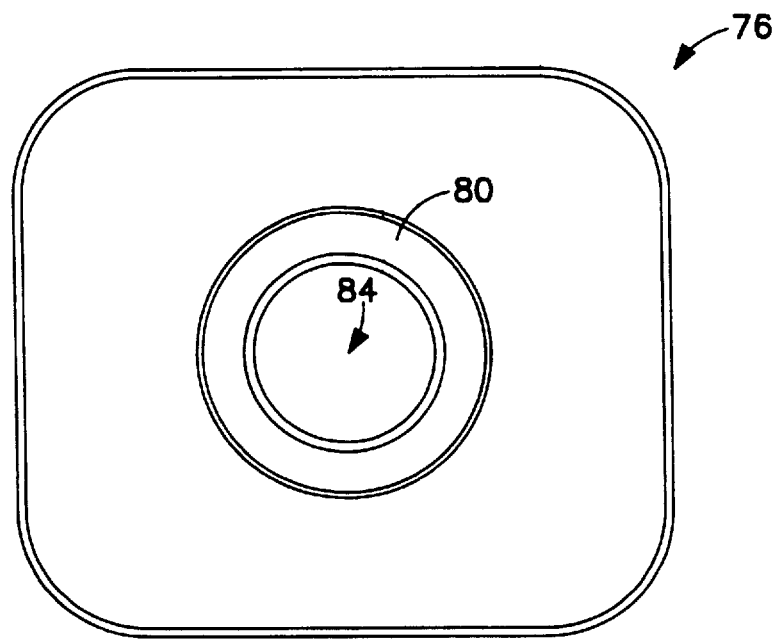
FIG. 12 is a top view of the reservoir of FIG. 11.
Figure 13:
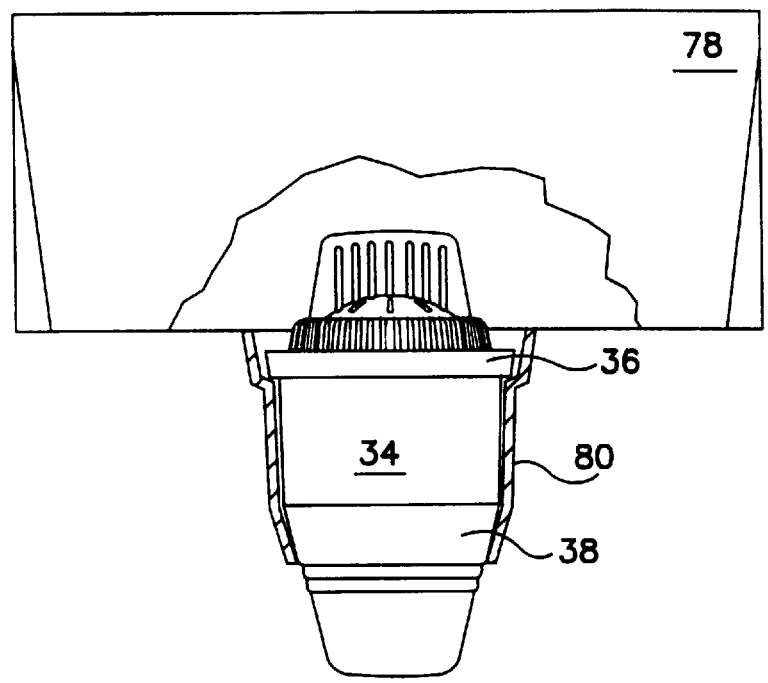
FIG. 13 is a partially cross-sectional side view of the water filtration cartridge of FIG. 5 received in the reservoir of FIG. 11.

A reservoir 76 configured to receive filter cartridge 34 is shown in FIGS. 11–13. Like reservoir 12, reservoir 76 has four fins 78, one at each edge of the reservoir.

Reservoir 76 also includes an extension 80 projecting from its lower surface. The upper end of extension 80 opens into the upper chamber 82 defined by reservoir 76. When reservoir 76 is installed into pitcher 14, the lower end of extension 80 projects into lower chamber 18 (FIGS. 1–3).

The inner surface of extension 80 defines a passage 84 extending between the upper and lower ends of the extension. The contour of the inner surface is selected to correspond to the outer contour 61 of filter cartridge 34 (FIG. 9). This not only allows filter cartridge 34 to be quickly and positively installed into reservoir 76, but also provides for a seal between the two that is relatively water-tight in normal use.

The inner surface of the extension comprises two regions. The lower region 86 includes a cylindrical surface 88 joined at its lower end to a frustoconical surface 90. The nonuniform taper provided by cylindrical surface 88 and frustoconical surface 90 is selected to correspond to the nonuniform taper of the outer contour 61 of body 38 of the filter cartridge (FIGS. 9 and 13). An upper region 92 above lower region 86 defines a recess 94. Recess 94 is configured to receive the cap 36 of the filter cartridge.

Figure 14:
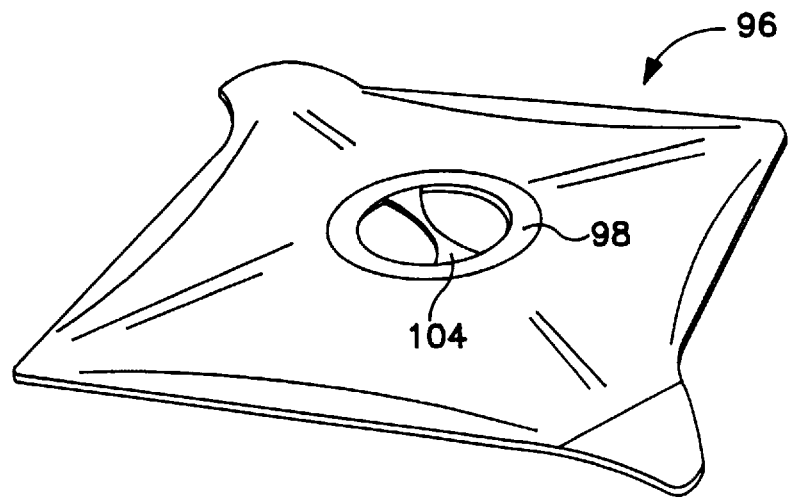
FIG. 14 is a perspective view of a lid for a water filtration system.
Figure 15:
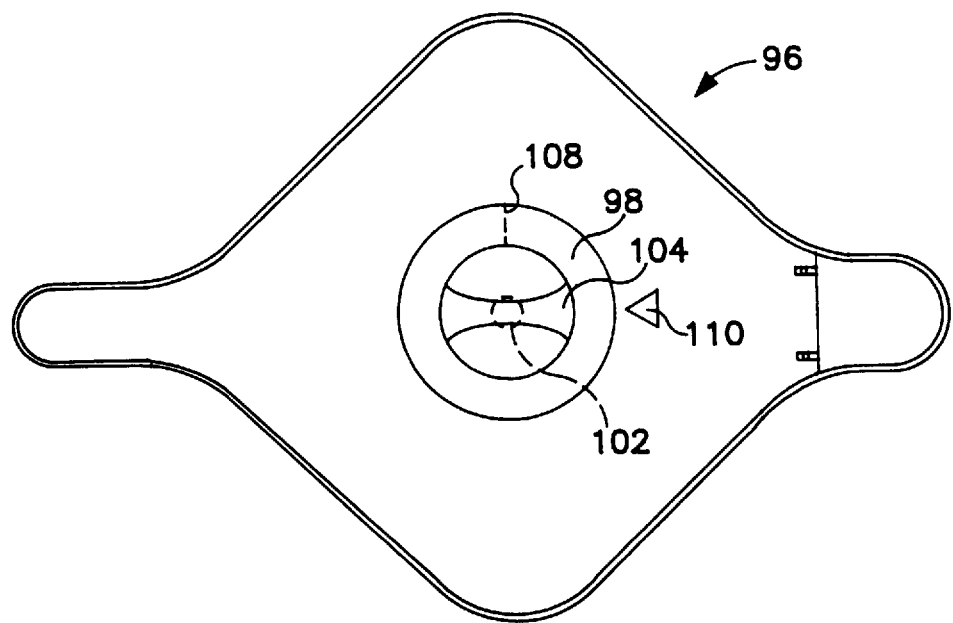
FIG. 15 is a top view of the lid of FIG. 14.
Figure 16:
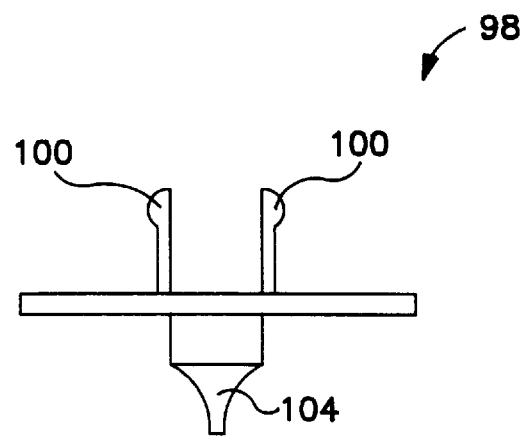
FIG. 16 is a side view of a dial for the lid of FIG. 14.
Figure 17:
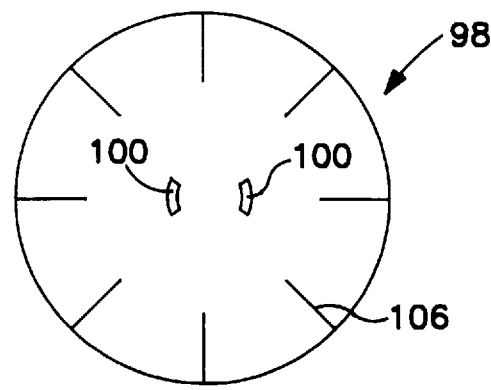
FIG. 17 is a bottom view of the dial of FIG. 16.

A filter cartridge typically becomes exhausted after filtering a certain volume of water, and should periodically be replaced with a fresh cartridge (e.g., after the filter cartridge has processed fifty "batches" of water). To facilitate tracking of the amount of water filtered, a lid 96 for the pitcher and reservoir is provided with an indicator dial 98, as shown in FIGS. 14 and 15. Referring also to FIG. 16, a pair of prongs 100 projecting from the bottom surface of dial 98 engages a hole 102 in lid 96, allowing the dial to be rotated with respect to the lid. A grippable handle 104 on the top side of dial 98 facilitates rotation. As shown in FIG. 17, a series of radially extending slots 106 is disposed around the periphery of the bottom side of the dial. (For clarity, only 8 slots 106 are shown in FIG. 17. The number of slots will typically be greater, equalling the recommended maximum number of batches of water that should be processed by a single filter cartridge, e.g., fifty.) Slots 106 are sized and configured to engage a tab 108 on the upper surface of lid 96. The arrangement of slots 106 and tab 108 serves as a detent mechanism, providing positive tactile feedback to the user with each step of rotation. Additionally, tab 108 and slots 106 are angled, serving as a ratchet that permits rotation in one direction only.

Figure 18:
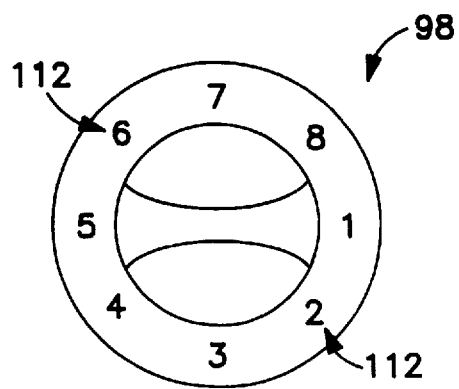
FIG. 18 is a top view of the dial of FIG. 16.

As shown in FIG. 15, use indicia on the lid includes a pointer 110, which can be, e.g., marked or embossed directly onto the surface. Pointer 110 points at indicator dial 98. Indicia is also disposed on indicator dial 98, as shown in FIG. 18.

Indicia 112 on indicator dial 98 comprises a sequence of numbers, one through eight. The indicia numerals are arranged around the periphery of the dial such that at each detent position defined by tab 108 and slots 106, one of the indicia numerals aligns with pointer 110 on the lid (FIG. 15). There is thus a unique visible configuration (pointer pointing at "1", pointer pointing at "2", etc.) for each rotational step of the indicator dial. If the dial rotation is ratcheted, the ratchet permits the dial to be rotated in the counterclockwise direction. The dial could be configured to rotate instead in the clockwise direction, in which case the arrangement of the indicia numerals would be reversed.

Figure 19:
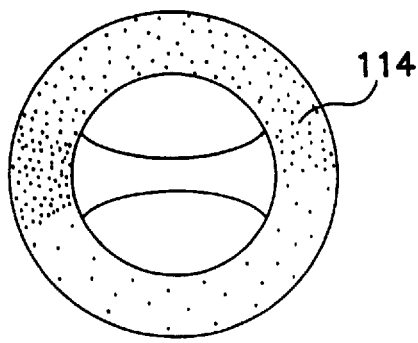
FIG. 19 is a top view of another dial.
Figure 20:
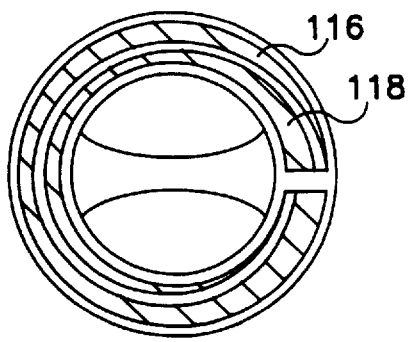
FIG. 20 is a top view of another dial.
Figure 21:
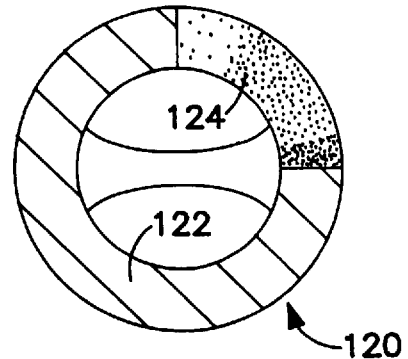
FIG. 21 is a top view of another dial.

Because the dial is often small, and because it is often desirable to have greater than eight rotational steps in each revolution of the dial, numeral or alphabetical indicia may be difficult to see on the dial. Alternatively or additionally, a color indicia can be used. For instance, as shown in FIG. 19, the indicia around the periphery of the dial can be a single color band 114 that gradually changes in color from green (e.g., to indicate that the filter is still fresh) to red (e.g., to indicate that the filter should be replaced) over a full revolution. Alternatively, as shown in FIG. 20, the indicia around the periphery of the dial can be two tapered color bands 116, 118, one green and the other red. Alternatively, as shown in FIG. 21, the color indicia band 120 can be uniform in color (e.g., aqua) over, e.g., ¾ of its circumference (region 122), and variable in color (e.g., aqua to black) over the remaining ¼ of its circumference (region 124).

In any of the above configurations, the indicia on the dial and on the lid can be reversed. For instance, the dial could bear a pointer indicia, and the lid could bear a sequence of alphanumeric or color indicia.

Also, although the filter cartridges disclosed herein have been described for use in gravity-fed water filtration systems, aspects of these filter cartridge designs could be employed in filters for pressure-fed systems.

What is claimed is:

1. A water filter cartridge comprising:

a housing having first and second ends and an inner surface, the inner surface defining an interior region disposed along a central axis extending between the first and second ends of the housing;

a water inlet defined in a wall of the housing and opening into the interior region of the housing;

a water outlet defined in a wall of the housing opening into the interior region of the housing;

a first ridge defined by the inner surface of the housing between the water inlet and the water outlet, the first ridge projecting inwardly towards the central axis and terminating at an innermost end, the innermost end of the first ridge being disposed a first distance from the central axis, and a second ridge adjacent the first ridge defined by the inner surface of the housing between the first ridge and the water outlet, the second ridge projecting inwardly towards the central axis and terminating at an innermost end, the innermost end of the second ridge being disposed a second distance less than the first distance from the central axis.

2. The water filter cartridge of claim 1 further comprising:

a third ridge defined by the inner surface of the housing between the second ridge and the water outlet, the third ridge projecting inwardly towards the central axis and terminating at an innermost end, the innermost end of the third ridge being disposed a third distance less than the second distance from the central axis.

3. The water filter cartridge of claim 1 wherein the first and second ridges are disposed immediately adjacent to one another.

4. The water filter cartridge of claim 1 wherein the inner surface is circular in cross-section along the central axis in a region including the first and second ridges.

5. The water filter cartridge of claim 4 wherein the first and second ridges extend around the full circumference of the inner surface.

6. The water filter cartridge of claim 1 wherein the first and second ridges are concentric with the central axis of the housing.

7. The water filter cartridge of claim 1 wherein the first ridge is parallel to the second ridge.

8. The water filter cartridge of claim 1 wherein the first and second ridges are disposed on a tapered region of the inner surface.

9. The water filter cartridge of claim 8 wherein the first and second ridges are disposed on a frustoconical region of the inner surface.

10. The water filter cartridge of claim 9 wherein the water outlet is disposed closer to a small-diameter end of the frustoconical region than to a large-diameter end of the frustoconical region.

11. The water filter cartridge of claim 9 wherein the inner surface includes a cylindrical region joined at one end to the frustoconical region.

12. The water filter cartridge of claim 1 further comprising an air vent defined in a wall of the housing and opening into the interior region of the housing, the water inlet being disposed between the air vent and the water outlet.

13. A water filter cartridge comprising:
 a housing having first and second ends and an inner surface, the inner surface defining an interior region disposed along a central axis extending between the first and second ends of the housing;
 a water inlet defined in a wall of the housing and opening into the interior region of the housing; and
 a water outlet defined in a wall of the housing and opening into the interior region to the housing;
 the inner surface of the housing comprising a first surface having first and second ends and a tapered surface having large-diameter and small-diameter ends, a taper of the tapered surface being greater than a taper of the first surface;
 a ridge defined by the inner surface of the housing disposed intermediate the large-diameter and small-diameter ends of the tapered surface;
 the first end of the first surface extending to the water inlet, and the small-diameter end of the tapered surface extending to the water outlet,
 the second end of the first surface being joined to the large-diameter end of the tapered surface; and
 the length of the first surface along the central axis being substantially equal to the length of the tapered surface along the central axis.

14. The water filter cartridge of claim 13 wherein the diameter of the second end of the first surface is substantially equal to the diameter of the large-diameter end of the tapered surface.

15. The water filter cartridge of claim 13 wherein the first surface comprises a cylindrical surface.

16. The water filter cartridge of claim 13 wherein the tapered surface comprises a frustoconical surface.

17. The water filter cartridge of claim 13 wherein the housing comprises a cap at the first end of the first surface, and wherein the water inlet is defined in a wall of the cap.

18. The water filter cartridge of claim 13 wherein the water outlet is defined in a wall at the small-diameter end of the tapered surface.

* * * * *